United States Patent [19]

Percy et al.

[11] 4,308,554
[45] Dec. 29, 1981

[54] TELEVISION VIEWER REACTION DETERMINING SYSTEM

[75] Inventors: Roger D. Percy; David C. M. Wilding, both of Seattle, Wash.; Sholly Kagan, Boston, Mass.

[73] Assignee: R. D. Percy & Company, Seattle, Wash.

[21] Appl. No.: 890,739

[22] Filed: Mar. 27, 1978

Related U.S. Application Data

[63] Continuation of Ser. No. 763,966, Jan. 31, 1977, Pat. No. 4,107,735.

[51] Int. Cl.³ .............................................. H04M 7/00
[52] U.S. Cl. ...................................... 358/84; 358/86; 358/194.1; 455/2; 455/5
[58] Field of Search .......................... 325/31, 308, 309; 235/82, 51, 92 R, 92 CT, 92 TE, 92 TD; 358/114, 124, 85, 84, 194I, 86; 455/2, 5

[56] References Cited

U.S. PATENT DOCUMENTS

| | | | |
|---|---|---|---|
| 2,514,086 | 7/1950 | Owens | 346/37 |
| 2,855,993 | 10/1958 | Rahmel | 358/84 |
| 3,034,707 | 5/1962 | Jefferson | 235/52 |
| 3,255,306 | 6/1966 | Campbell et al. | 358/86 |
| 3,524,015 | 8/1970 | Campbell | 358/86 |
| 3,987,397 | 10/1976 | Belcher et al. | 455/5 |
| 3,990,012 | 11/1976 | Karmes | 455/2 |
| 4,107,735 | 8/1978 | Frohbach | 358/84 |

OTHER PUBLICATIONS

John O. Campbell, "Design Parameters for Integrated Urban Comm.", Jun. 1970, Journal of the SMPTE, pp. 532-536.

*Primary Examiner*—Robert L. Richardson
*Assistant Examiner*—Edward L. Coles
*Attorney, Agent, or Firm*—Benoit Law Corporation

[57] ABSTRACT

A system for determining viewing habits of television viewers, or television viewer reaction, in a multi-channel television broadcast reception area includes television broadcast display set. A remote control for the television set has a first manually actuable device located across the room from the television set for causing the television set to display a television broadcast received on any one of a predetermined number of channels. A facility is provided for viewers to register their reactions to displayed television broadcasts in the context of channel selection. This viewer reaction registering facility includes a second manually actuable device located adjacent the mentioned first manually actuable device. Apparatus is coupled to the remote control for determining for each broadcast displayed by the television set the channel on which that broadcast is being received and the viewer reactions to a displayed broadcast received over the latter channel.

12 Claims, 3 Drawing Figures

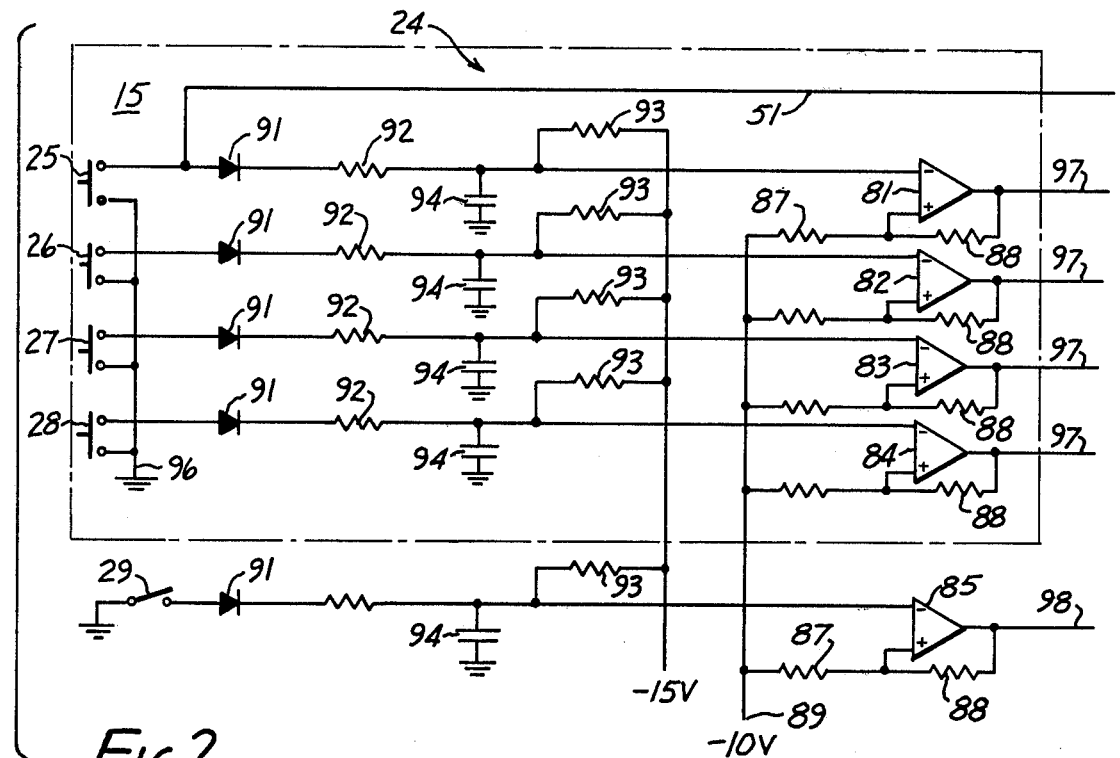
FIG.2
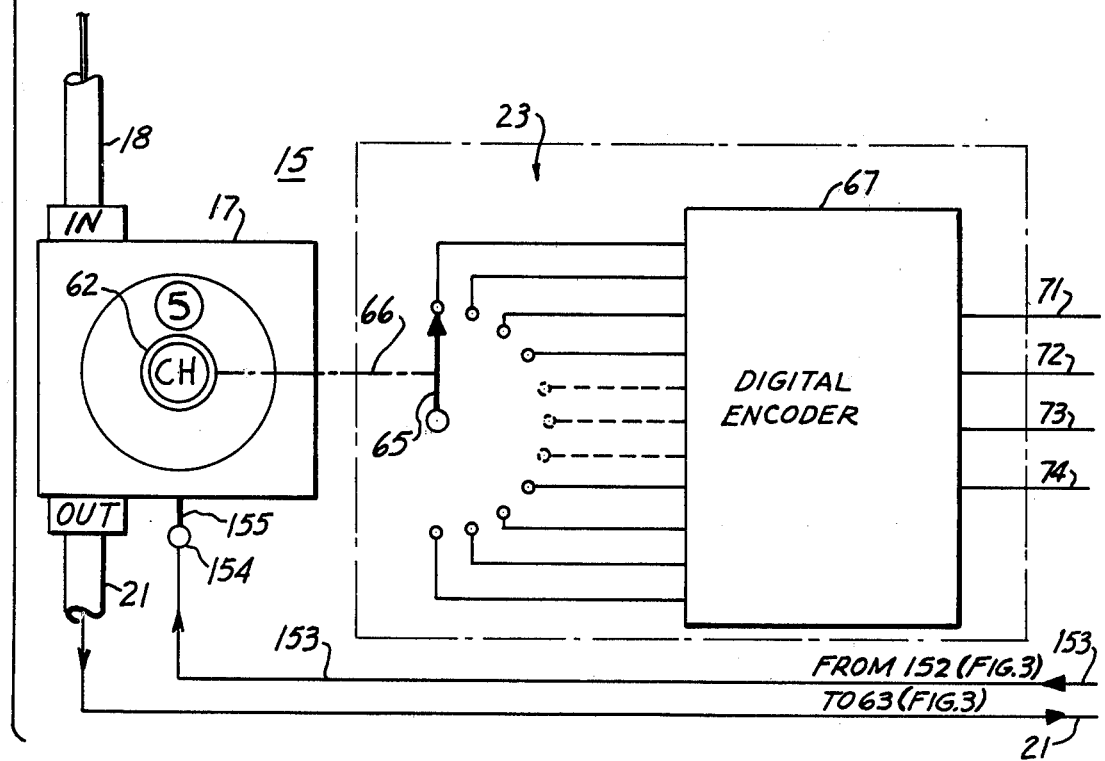

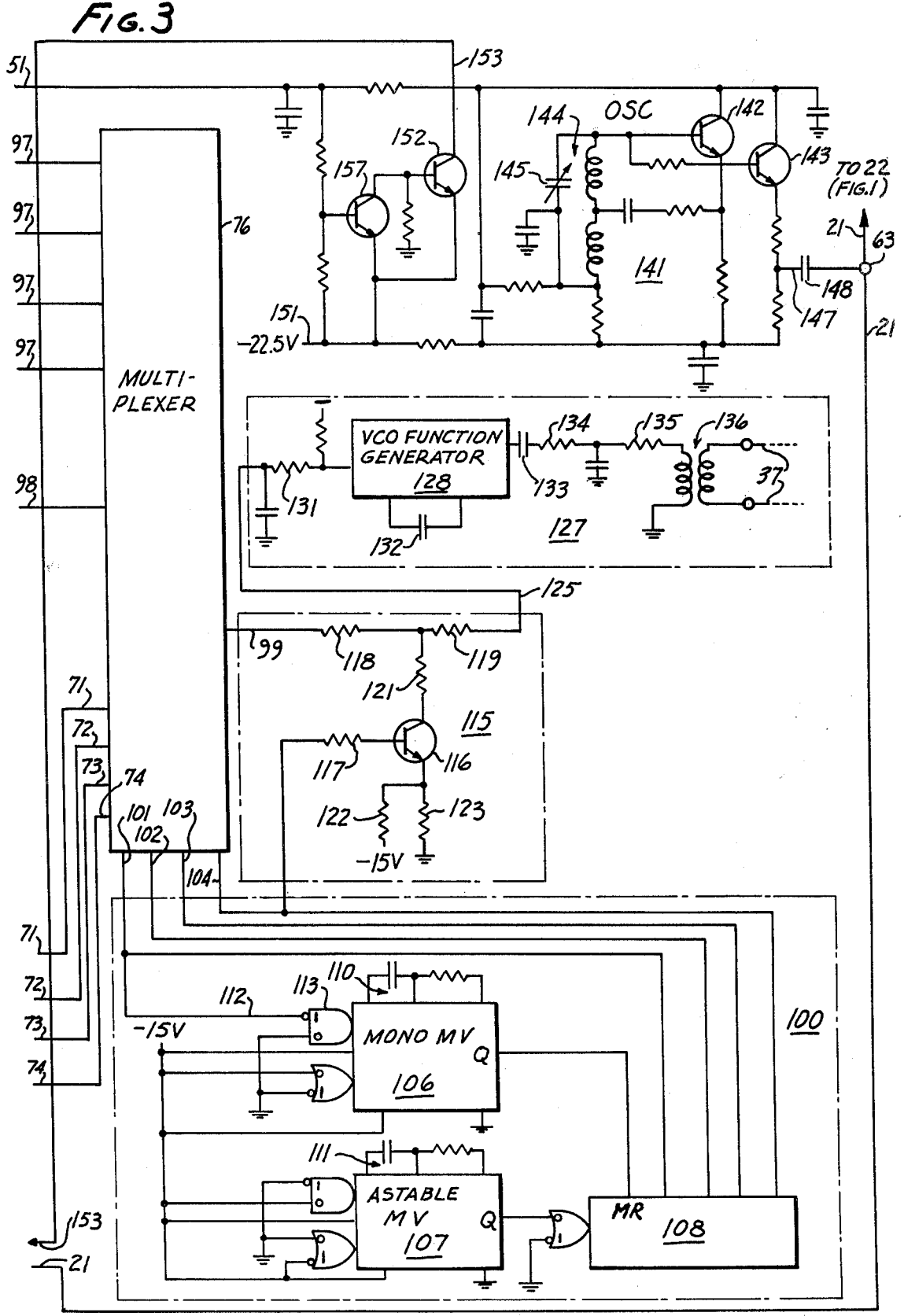

TELEVISION VIEWER REACTION DETERMINING SYSTEM

CROSS-REFERENCE

This is a continuation of application Ser. No. 763,966, filed Jan. 31, 1977, now U.S. Pat. No. 4,107,735.

BACKGROUND OF THE INVENTION

1. Field of the Invention

The subject invention relates to television viewer survey systems and, more specifically, to systems for determining viewing habits of television viewers and television viewer reaction.

2. Description of the Prior Art

The preferences and reactions of broadcast program recipients has practically always been a concern of broadcasters and advertisers. Accordingly, a very large number of proposals and systems exists for determining listening and viewing habits of radio and television broadcast recipients, with and without facilities for registering and determining reactions of radio and television listeners and viewers to received programs.

A similar concern has centered on the reaction of audiences to motion picture displays or other presentations in theatres. An extensive description of such a system is contained in U.S. Pat. No. 2,712,976 by P. H. Blaustein et al, issued July 12, 1955, and herewith incorporated by reference herein.

Only very few of the many proposals have found practical acceptance and severe doubts persist as to the accuracy of even the most widely used viewer reaction determining systems.

In particular, an insufficient utilization of the potential of channel selection or change as a viewer reaction device is present whenever a prior-art system presents any inconvenience to the viewer to change channels in response to his reaction to a displayed television program. Existing systems also suffer from a disassociation of channel selection and other registered forms of viewer reaction which is detrimental in instances where channel selection as such may be attributable to factors other than unfavorable reaction to a displayed television program.

Existing systems, moreover, suffer from a lack of viewer participation incentive. In particular, many viewers tire of their participation for lack of an assuring indication to them that their contribution matters and is meaningful.

SUMMARY OF THE INVENTION

It is broadly an object of this invention to overcome the above mentioned disadvantages.

It is a related object of this invention to provide improved systems for determining viewing habits of television viewers.

It is a germane object of this invention to provide improved systems for determining reactions of television viewers to broadcast programs.

It is also an object of this invention to provide improved apparatus for television audience survey systems.

It is also an object of this invention to provide television audience survey systems which improve acceptability by the television audience and accuracy of the survey by avoiding any substantial disturbance of the comfort of the viewers and by keeping any extra efforts on the part of the viewers at a minimum.

It is a related object of this invention to utilize more fully the potential of channel selection or change as a meaningful television viewer reaction device.

It is also an object of this invention to provide for a close association of channel selection or change with more direct forms of registered viewer reaction.

It is a further object of this invention to encourage increased and more meaningful viewer participation.

Other objects will become apparent in the further course of this disclosure.

From a first aspect thereof, the subject invention resides in a system for determining viewing habits of television viewers in a multi-channel television broadcast reception area including a television broadcast display set. The invention according to this aspect resides in the improvement comprising, in combination, a remote control for the television set including manually actuable means located at a distance from the television set for causing the television set to display a television broadcast received on any one of a predetermined number of channels, means coupled to the remote control for determining for each broadcast displayed by the television set the channel on which that broadcast is being received, and means connected to the determining means for polling the determining means as to the channel on which a broadcast displayed by the television set is received.

From another aspect, the invention, in a system of the type mentioned, resides in the improvement comprising, in combination, a remote control for the television set including manually actuable means located at a distance from the television set for transposing each television broadcast received on any of a predetermined number of channels to one predetermined channel, means connected to the remote control and the television set for transmitting any television broadcast over the one predetermined channel for display by the television set, means coupled to said remote control for determining for each broadcast displayed by the television set the channel on which that broadcast is being received, and means connected to the determining means for polling the determining means as to the channel on which a broadcast displayed by the television set is received.

From another aspect, the invention, in a system of the type mentioned, resides in the improvement comprising, in combination, a remote control for the television set including a manually actuable channel tuner located at a distance from the television set for selectively receiving television broadcasts on any one of a predetermined number of channels, means connected to the remote control and the television set for transmitting any selectively received television broadcast from the tuner over the distance for display by the television set, means coupled to the remote control for determining for each broadcast displayed by the television set the channel on which that broadcast is being received, and means connected to the determining means for polling the determining means as to the channel on which a broadcast displayed by the television set is received.

From another aspect, the invention, in a system of the type mentioned, resides in the improvement comprising, in combination, a remote control for the television set including first manually actuable means located at a distance from the television set across the room for causing the television set to display a television broadcast received on any one of a predetermined number of channels and means for providing viewers with a facility to register viewer reactions in the context of channel selection, including second manually actuable means adjacent the first manually actuable means for receiving television viewer reactions to displayed television broadcasts, means coupled to the across-the-room remote control for determining for each broadcast displayed by the television set the channel on which that broadcast is being received, and means connected to the determining means and coupled to the second manually actuable means for polling the determining means as to the channel on which a broadcast displayed by the television set is received and the second manually actuable means as to received viewer reactions to a displayed broadcast received over the latter channel.

From another aspect, the invention, in a system of the type mentioned, resides in the improvement comprising, in combination, a remote control for the television set including first manually actuable means located at a distance from the television set across the room for transposing each television broadcast received on any one of a predetermined number of channels to one predetermined channel, and means for providing viewers with a facility to register viewer reactions in the context of channel selection, including second manually actuable means adjacent the first manually actuable means for receiving television viewer reactions, means connected to the across-the-room remote control and the television set for transmitting any television broadcast over the one predetermined channel for display by the television set, means coupled to the across-the-room remote control for determining for each broadcast displayed by the television set the channel on which that broadcast is being received, and means connected to the determining means and coupled to the second manually actuable means for polling the determining means as to the channel on which a broadcast displayed by the television set is received and the second manually actuable means as to received viewer reactions to a displayed broadcast received over the latter channel.

From another aspect, the invention, in a system of the type mentioned, resides in the improvement comprising, in combination, a remote control for the television set including a manually actuable channel tuner located at a distance from the television set across the room for selectively receiving television broadcasts on any one of a predetermined number of channels and means for providing viewers with a facility to register viewer reactions in the context of channel selection, including manually actuable means adjacent the channel tuner for receiving television viewer reactions, means connected to the across-the-room remote control and the television set for transmitting any selectively received broadcast from the tuner over the distance for display by said television set, means coupled to the across-the-room remote control for determining for each broadcast displayed by the television set the channel on which that broadcast is being received, and means connected to the determining means and coupled to the means for receiving television viewer reactions for polling the determining means as to the channel on which a broadcast displayed by the television set is received and the means for receiving television viewer reactions as to received viewer reactions to a displayed broadcast received over the latter channel.

BRIEF DESCRIPTION OF THE DRAWINGS

The invention and its aspects and objects will become more readily apparent from the following description of preferred embodiments thereof, illustrated by way of example in the accompanying drawings, in which like reference numerals designate like or functionally equivalent parts, and in which:

FIGS. 2 and 3, to be positioned side-by-side, present a combined circuit and block diagram of a system for determining viewing habits of television viewers in accordance with a further preferred embodiment of the subject invention.

DESCRIPTION OF PREFERRED EMBODIMENTS

Figure 1:
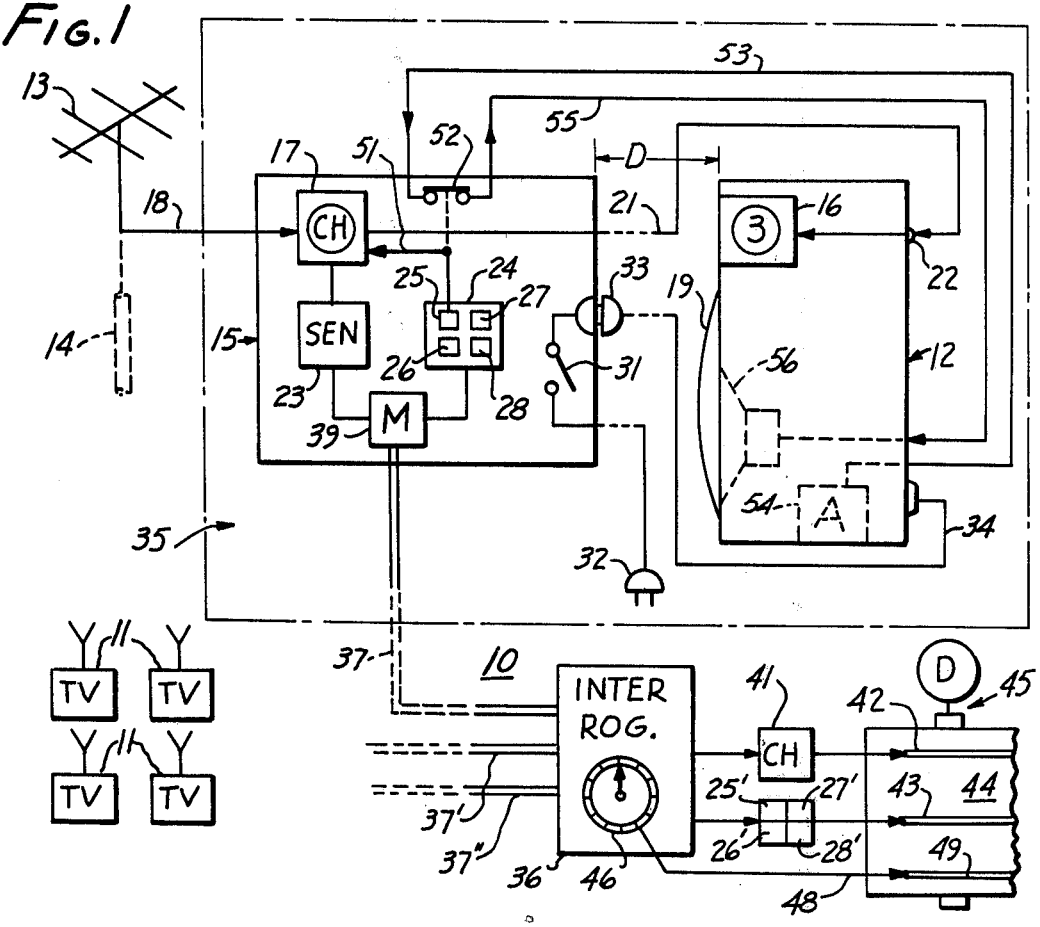
FIG. 1 is a block diagram of a system for determining viewing habits of television viewers in accordance with a preferred embodiment of the subject invention.

The system 10 for determining viewing habits of television viewers according to the preferred embodiment of the invention shown in FIG. 1 operates with a conventional television broadcast display set 12 in a multichannel television broadcast reception area wherein broadcasts from different television stations 11 operating over different transmitters at different frequencies or channels are received via such conventional means as a television antenna 13. Alternatively, the subject invention and its preferred embodiments may be practiced with cable television systems wherein television broadcasts or programs are received at different frequencies or through different channels via a cable 14.

As shown in FIG. 1, the system 10 includes a remote control 15 which is located at a distance D from the television set 12. Typically, the remote control 15 is of the familiar across-the-room television remote control type that is popularly used by television viewers as a convenient means for changing viewing channels and effecting other necessary or desired adjustments of the television set.

Typically, the television set 12, being of a conventional type, would have its own tuner or channel selector 16. However, in the illustrated system, channel selection is not effected by the tuner 16 of the set 12 when the remote control 15 is operated. Rather, the remote control 15 has its own tuner or channel selection facility 17 for changing the channels of the TV set 12.

The antenna or cable leads 18 of the antenna 13 or cable 14 are applied to the channel tuner 17 of the remote control 15 which, being located at a distance D from the television set 12, remotely causes the television set to display with a video display tube 19, a television broadcast received on any one of a predetermined number of channels as determined by the range of the remote control tuner 17 and the availability of channels at the location of the antenna 13 or via the cable 14.

The manually actuable remote control tuner 17 preferably transposes each television broadcast received on any one of the predetermined number of channels to one predetermined channel. In particular, the remote control tuner may be constructed to transpose or convert each received channel, to which the tuner 16 is manually adjusted, to one and the same channel, such as to channel 3.

A cable or other suitable transmission facility is connected to, and extends between, the remote control 15 and the television set 12 for transmitting any television broadcast over the one predetermined transposed or converted channel for display by the television set on the video tube 19.

In particular, the cable extends from the output of the remote control tuner 17 to the input of the local tuner 16 via antenna terminals 22 of the set 12.

It is thus seen that the remote manually actuable channel tuner 17, located at a distance D from the television set 12, selectively receives television broadcasts on any one of the predetermined number of channels receivable via the antenna 13 or cable 14, and that a cable 21 transmits any selectively received television broadcast from the remote tuner 17 over the distance D for display by the television set 12. Each time the viewer wishes to change channels, he or she would manually actuate the remote channel tuner or selector 17 from the convenience of his or her preferred viewing position. No protection is herein claimed for this feature per se, since channel switching remote controls for television sets are old as such.

However, in accordance with the subject invention, the remotely switched channel on which a particular broadcast is being received is determined for each broadcast displayed by the television set 12, and such determination of the remotely switched channel is polled for an evaluation or determination of the viewing habits of television viewers in a multi-channel television broadcast reception area.

In particular, a sensor 23 is coupled to the remote control 15 for determining for each broadcast displayed by the television set 12 the channel on which that broadcast is being received. The sensor 23 may preferably be included in the remote control.

The system 10 according to the preferred embodiment illustrated in FIG. 1 also includes a second manually actuable device 24 located in the remote control 15 in addition to and adjacent the remote manually actuable channel tuner 17. The device 24 may have a keyboard or other manually actuable input means for receiving television viewer reactions to broadcasts displayed by the television set 12 on the video tube or screen 19.

As indicated in FIG. 1, the viewer reaction device 24 may, for instance, have four push buttons 25 to 28 for enabling the viewer to register his or her reaction to a displayed program on a graduated scale from very unfavorable to very favorable, or within any other predetermined pattern of possible responses.

As a convenience, the remote control 15 may also have an on-off switch 31 which, for instance, may be located in a circuit extending from a power plug 32, insertable into a wall outlet (not shown), via the power plug 33 and power cord 34 of the set 12. No claim of novelty is herein made for this on-off switching convenience as such.

In practice, the television set 12 and remote control 15 will typically be located in one and the same room 35. On the other hand, a centrally located interrogation unit 36 is connected via lines 37 to the channel determining device or sensor 23 and to the manually actuable reaction receiving device 24 for polling the sensor 23 as to the channel on which a broadcast displayed by the television set 12 is received and for also polling the reaction device 24 as to received viewer reactions to a displayed broadcast received from the polled channel. According to FIGS. 2 and 3 (switch 29, FIG. 2), the centrally located interrogation unit also polls the or each television set as to its on/off condition.

In principle, the interrogating unit 36 could poll the devices 23, 24, and 29 or 31 at very brief intervals so that each channel switching and viewer reaction and each set on/off condition will be picked up. While this is within the broad contemplation of the subject invention, it generally is more practical to provide longer intervals between polling cycles. In that case, it is desirable to provide a memory facility 39 which preferably is combined with or included in the remote control 15 in order to register or memorize the channel determination effected by the sensor 23 and the viewer reactions received by the device 24. The interrogating unit 36 would then interrogate the memory 39 from time to time.

As indicated by a block 41, the interrogator 36 may output each channel determination. The interrogator 36 may also output each received viewer reaction 25' to 28' corresponding to the push buttons 25 to 28. The corresponding channel determinations and viewer reactions may then be recorded in channels 42 and 43 on a magnetic or other recording medium 44 that is advanced by a tape drive 45.

In practice, a plurality of television sets and viewers are served and interrogated by the system 10. By way of example, the FIG. 1 shows several lines 37, 37' and 37" leading to the interrogator 36 from the remote control 15 and from other identical remote controls in the homes of different viewers. As indicated by a dial 46, the interrogator 36 periodically interrogates or polls these different remote controls 15 etc. as to the channel on which a broadcast is being displayed by each television set 12 etc. and as to the viewer reaction received at each remote control 15 etc. As indicated at 48, a signal identifying each polled viewer or television set is recorded in a track 49 in parallel to the corresponding channel and viewer reaction determinations in tracks 42 and 43.

As a special feature in accordance with a preferred embodiment of the subject invention, the system 10 includes a facility for altering the display of a television broadcast in response to a received television viewer reaction manifested by actuation of the second device 24, rather than by actuation of the channel tuner 17.

In particular, if the viewer reaction registered by actuation of any one of the buttons 26 to 28 is considered a first viewer reaction, then the reaction registered by actuation of the button 25 may be considered a second viewer reaction to a television broadcast displayed by the set 12.

As indicated by a line 51 between the button 25 and the channel selector 17, actuation of the button 25 is capable of altering the display of a television broadcast by the set 12 in response to a received second television viewer reaction. By way of example, the alteration of the television broadcast display may take the form of a blanking of the television picture or of another manifestation perceivable by the viewer who has actuated the button 25 of the remote device 15.

Alternatively or additionally, another aspect of the displayed television broadcast may be altered in response to actuation of the button 25. For instance, the push button 25 may be coupled to actuate or open a switch 52 which is in circuit with a line 53 which extends from the output of the audio part 54 of the television set to the remote control 15 and a lead 55 which extends from the remote control 15 to the loudspeaker 56 of the television set 12.

Accordingly, actuation of the push button 25 at the remote control 15 will interrupt the sound accompaniment of the displayed television broadcast to which the viewer has reacted.

In practice, the feature just described has the great advantage of confirming to the viewer in a readily perceptible manner that the manifestation of his reaction exerts a perceptible control on the system.

In terms of practical results, this will make the viewer a more determined and thus valuable participant, than if no perceptible indication of the efficacy of his participation were given. In principle, the system could provide at the television set 12, such as on the display screen 19, a different discernible manifestation of any one of the different viewer reactions registered via buttons 25 to 28.

In terms of the illustrated system, it is important to recognize that the disclosed alteration of the display of a television broadcast in response to one or more received viewer reactions is a concomitant of the channel selection and viewer reaction interrogation or polling carried on by the equipment 36, etc.

A practical example of the system of the subject invention is shown in, and will now be described with reference to, FIGS. 2 et seq.

The equipment shown in FIGS. 2 and 3 of the accompanying drawings may all be included in the remote control 15 which, as illustrated in FIG. 1, is located at a distance D from the remotely controlled television set 12. In this respect, at least the first and second manually actuable devices 17 and 24 are located in the remote control 15 at a distance from the television set in accordance with the principles of the illustrated preferred embodiments of the subject invention.

By way of example, the first manually actuable device preferably is a remote channel selector or tuner 17 which accepts television programs on any of the available channels via an input cable 18 and which transposes any of these received broadcasts selectively to a predetermined channel or frequency band. The selection as to which of the available channels is being transposed is made on the basis of appropriate adjustment of the channel selector knob and dial 62 of the remote tuner 17. Any transposed program is applied to the output cable 21 which extends to the antenna terminals 22 of the television set 12 (see FIG. 1) via a tuner or remote control output 63.

The type of remote tuner employed in the practice of the illustrated preferred embodiments of the invention is well known in the television circuitry field, and typically includes conventional circuits with tuning or channel switching means for receiving television broadcasts on any one of the available channels, together with an oscillator for providing a carrier of variable frequency to translate the selected received television broadcast bands to the desired output channel allocation, for example channel 3.

Remote channel selectors of the type of tuner 17 are commercially available and are manufactured by such companies as Jerrold Electronics Corporation.

According to FIG. 2, the channel sensor 23 has a rotary switch 65 ganged with the channel selector knob 62 of the remote tuner 17 as indicated by a phantom line 66.

A digital encoder 67, which may be of a conventional type, encodes the position of the rotary switch 65 and thus any of the channels selected by the remote tuner 17 in the form of a digital signal on four lines 71, 72, 73 and 74 extending from FIG. 2 to inputs of a multiplexer 76 shown in FIG. 3.

By way of example, the multiplexer 76 may be a COS/MOS Analog Multiplexer of the type CD4067B shown, for instance, on pages 553 to 557 of the RCA Integrated Circuits Databook 4-76.

The multiplexer 76 also handles the viewer reactions received via the viewer reaction device 24 and the on/off switch 29.

The viewer reaction registration device 24 comprises the above mentioned push buttons 25 to 28 in combination with corresponding operational amplifiers 81, 82, 83 and 84.

A further operational amplifier 85 cooperates with a switch 29 which indicates the on/off condition of the remote control 15 and television set 12 and, for that purpose, may be ganged with the on/off switch 31 shown in FIG. 1.

By way of example, the operational amplifiers 81 to 85 may be of the type XR-4212, may by EXAR INTEGRATED SYSTEMS, INC., and described, for instance, in their bulletin entitled "XR-4212 Quad Operational Amplifier" and dated April 1976.

Each operational amplifier 81 to 85 has a pair of series-connected resistors 87 and 88 associated therewith. The junction of the resistors 87 and 88 is connected to the non-inverting (+) input of the associated operational amplifier. The free end of each resistor 87 is connected to a terminal 89 to which a negative bias potential is applied. On the other hand, the free end of each resistor 88 is connected to the output of its associated operational amplifier.

Each of the buttons or switches 25 to 29 is individually connected to the inverting (−) input of an associated operational amplifier 81, 82, 83, 84 or 85 via a unidirectional current conducting device or diode 91 and series-connected resistor 92. The inverting (−) input of each operational amplifier, moreover, is biased with a negative potential via a resistor 93 and is provided with a storage capacitor 94. The storage capacitors 94 provide the system with a memory function which stores viewer reactions and the set on/off condition for convenient polling by the interrogating unit 36.

In the illustrated preferred embodiment, each capacitor 94 stores a charge resulting from actuation of its corresponding button or switch 25, 26, 27, 28 or 29 for a sufficient time for polling via multiplexer 76.

As indicated at 96, actuation of each of the viewer reaction push buttons 25 to 28 will ground the line leading to the inverting (−) input of the associated operational amplifier. The signals resulting from such viewer reaction input are applied to the multiplexer 76 via lines 97 extending from FIG. 2 to FIG. 3 in the drawings.

Similarly, closure of the switch 29 will ground the line leading to the inverting (−) input of the operational amplifier 85, and the resulting on signal is applied via a line 98 from the operational amplifier 85 shown in FIG. 2 to the multiplexer 76 shown in FIG. 3.

The multiplexer 76 operates in the manner of a digitally controlled analog switch for a seriatim application of the channel selection, viewer reaction and on/off signals received via lines 71 to 74 and 97 and 98 to a multiplexer output 99. To this end, the multiplexer 76 is controlled by a timing unit 100 having leads 101, 102, 103 and 104 connected to the binary control inputs of the multiplexer.

The illustrated timing unit 100 is composed of a monostable multivibrator 106, an astable multivibrator 107 and a binary counter 108. The multivibrators 106 and 107 are equipped with RC timing elements 110 and 111.

A lead 112 extends from the timing lead 101 to the negative trigger input of the monostable control gate 113 of the multivibrator 106.

By way of example, the multivibrators 106 and 107 may be COS/MOS Monostable/Astable type CD4047AE described, for instance, on pages 470 to 475 of the above mentioned RCA Integrated Circuits Databook.

The Q output of the multivibrator 106 is connected to the master reset input of the binary counter 108. The Q output of the multivibrator 107 is connected to the clock input element of the counter 108. The leads 101 to 104, in turn, issue from four binary Q outputs of the counter 108.

By way of example, the counter 108 may be an internally synchronous binary counter of the type F4520 manufactured by Fairchild Semiconductor Company and described, for instance, on pages 4-173 and 4-174 of their MOS/CCD Data Book of 1975.

The binary output signal of the multiplexer 76 may be subjected to the action of a level alternation switch which alternates the level of the multiplexer output signal with the aid of an NPN transistor 116 having a base electrode connected via a resistor 117 to the least significant output lead 104 of the binary counter 108. The level alternation switch 115 further has two resistors 118 and 119 connected in series to the multiplexer output 99. The collector of the transistor 116 is connected to the junction between the resistors 118 and 119 via a resistor 121. The emitter of the transistor 116 is negatively biased via a resistor 122 and is connected to ground through a resistor 123 having a value about twice as high as the value of the resistor 122.

A lead 125 applies the multiplexed alternated signal to a modulator 127 for preparation of the information concerning selected channel, viewer reaction and condition of the television set for transmission via leads 37 to the central interrogating unit 36. By way of example, the modulator 127 may comprise a function generator 128 including a voltage controlled oscillator. By way of example, the component 28 may comprise the monolithic function generator type XR-2206, manufactured by EXAR INTEGRATED SYSTEMS, INC. and described, for instance, in their 1976 IC Update Master Catalog on pages 630 and 631.

In particular, the switch output signal of the multiplexer 76 is supplied via a resistor 131 to the input of the function generator 128. The voltage controlled oscillator of the function generator 128 is provided with a timing capacitor 132.

The modulated sinusoidal output of the function generator 128 is supplied via a coupling capacitor 133 and series-connected resistors 134 and 135 to the primary winding of the transformer 136 for transmission via the transformer secondary and leads 37 to the central interrogating unit 36. By way of example, the leads 37 may be part of a dedicated telephone line or of another suitable signal transmission channel.

As mentioned previously, and as indicated at 39 in FIG. 1, a memory may be combined with the multiplexer 76 in order to store viewer reactions and channel selections as a function of time for periodic polling by the central interrogating unit via lines 37.

The components of the interrogating unit 36 are not herein shown in detail, as they may be composed of conventional components complementary to the components shown in FIG. 3 and of other conventional means and equipment. For instance, the interrogator 36 may for each signal channel 37 have a component complementary to the function generator 128 or modulator 127 for demodulating the channel indication, viewer reaction and set condition indicating signals to a form similar to the form in which these signals appeared at the multiplexer output 99 or then to any other form desired for convenient polling and evaluation.

Similarly, the interrogator may have circuitry complementary to the multiplexer 76 in order to provide the signals in any desired processable pattern.

In accordance with conventional modern practice, the central interrogator may include conventional computer equipment for controlling and effecting the polling operation over signal lines 37, 37', 37'', etc., concerning the condition and presently active channel of the different participating television sets, as well as the reaction of the different participating television viewers.

Reference may in this connection be had to U.S. Pat. Nos. 3,947,624, 3,950,618, 3,803,491, 3,794,922, 3,744,712, 3,725,603, 3,716,654, 3,506,916, 3,453,641, 3,126,513, 3,058,065, 3,034,707, 2,935,557, 2,864,941, 2,751,449, 2,676,084, 2,660,508, 2,652,310, 2,630,367, 2,514,086, and 2,513,360 all of which are herewith incorporated by reference herein.

The illustrated preferred embodiment shown in FIGS. 2 and 3 also includes a particularly advantageous form of equipment for altering the display of a television broadcast in response to a received viewer reaction manifested by actuation of the viewer reaction device 24 at the remote control 15.

In particular, a lead 51 extends from the push button 25 shown in FIG. 2 to an oscillator 141 shown in FIG. 3 in order to actuate that oscillator upon depression of the push button 25.

The oscillator 141 includes a pair of NPN transistors 142 and 143 combined with an LC circuit 144 which is preferably tuned to a specific television channel of the set 12. A variable capacitor 145 may be employed in the oscillating circuit to tune the oscillator 141 to the center of that specific television channel. In practice, the oscillator 141 is tuned to the channel onto which the remote tuner 17 transposes each received television broadcast as described above.

The output lead 147 of the oscillator 141 is connected via a coupling capacitor 148 to the terminal 63 and thus via cable 21 to the antenna terminal 22 of the set 12.

As long as the button 25 is open, the oscillator 141 is inactive and the television program signals from the remote tuner 17 simply proceed via the tuner output cable 21 to the terminal 63 and thence to the antenna terminals 22 of the set and local tuner 16 adjusted to the channel onto which the remote tuner 17 transposes the received television program signals.

Upon depression of the viewer reaction button 25, the oscillator 141 is turned on via lead 51 and applies to the terminal 63, cable 21, antenna terminal 22 and local tuner 16, a signal that will modify the display of the particular television program by the set 12. For instance, the oscillator 141 may be designed to generate a signal which will obliterate or blank the display on the screen 19. By way of example, the oscillator 141 may be designed to generate a sine wave of sufficient intensity to affect the operation of the automatic gain control (AGC) of the television set 12 so that signals applied via the remote tuner 17 are blanked out as long as the button 25 is depressed.

In some instances, it is advantageous to interrupt the operation of the remote tuner 17 upon depression of the viewer reaction push button 25. For instance, and as shown in FIGS. 2 and 3, the power supply of the tuner 17 may proceed from a supply lead 151 via a switching transistor 152, lead 153, power input terminal 154 and power lead 155 to the remote tuner 17. As long as the viewer reaction switch 25 is open and the equipment is in operation, the power transistor 152 is closed and supplies the tuner 17 with operating power. Upon depression of the viewer reaction button 25, the base electrode of an NPN control transistor 157 is pulled toward ground whereby the control transistor 157 is caused to open the power transistor 152.

This, in turn, interrupts the power supply to, and thus the operation of, the remote tuner 17, whereby television broadcast signals are disabled from reaching the antenna terminals 22 of the set via the cable 21. Accordingly, display of the television program to which the viewer reacted by depressing the button 25 is rendered impossible for the moment.

The buttons 25 to 28 may represent different degrees or kinds of viewer reaction. For instance, the button 28 may be labeled for registration of a very favorable viewer reaction. The button 27 may then be labeled for a moderately favorable viewer reaction. By contrast, the button 26 may be labeled for registering a moderately unfavorable viewer reaction.

In practice, the button 25 is preferably reserved for the most unfavorable viewer reaction. In particular, the blanking of the television program associated with the button 25 provides an appeal to a certain curious human desire to have everything go ZAP if one is very dissatisfied. By providing this ZAP facility, the value of the system is greatly enhanced in terms of reliability, since that facility provides the viewer with an incentive to register his reactions. At the same time, the ZAP facility provides a safeguard against overreaction or careless manipulation, since a viewer would, of course, not want to blank out a picture with which he is satisfied or only moderately dissatisfied.

The illustrated preferred embodiments of the subject invention thus meet all the initially mentioned objects.

In particular, by rendering channel selection both remote and pollable, the viewer is provided with a tool that permits him to effect channel selection as a spontaneous reaction to displayed programs from the comfort of his viewing position, whereby channel selection and change are rendered a more proximate indication of viewer reaction than if the viewer would have to leave his viewing position and walk across the room to the television set to change channels.

Also, by combining channel selection (17) and push button type reaction registration (24) in one conveniently actuated unit (15), channel selection and change as a viewer reaction device are rendered more meaningful. This is particularly the case where channel selection and change may not in each instance be the result of an unfavorable reaction to a particular program. The illustrated preferred embodiment removes this ambiguity by giving the viewer a tool (24) to register his reaction in the general context of channel selection (17).

Moreover, by giving the viewer an opportunity to alter the television display in response to at least one of his registered reactions (25), the viewer is encouraged to maintain his participation alive and meaningful, in the context of a system that assures him that his reaction is registered and will matter in forthcoming program development.

Various modifications and variations within the spirit and scope of the subject invention will suggest themselves or become apparent from the subject extensive disclosure to those skilled in the art.

We claim:

1. In a system for determining viewing habits of television viewers in a multi-channel television broadcast reception area including a television broadcast display set located in a room, the improvement comprising in combination:

a remote control for said television set including first manually actuable means located at a distance from said television set across the room for causing said television set to display a television broadcast received on any one of a predetermined number of channels and means for providing viewers with a facility to register viewer reactions in the context of channel selection, including second manually actuable means adjacent said first manually actuable means for receiving television viewer reactions to displayed television broadcasts;

means coupled to said across-the-room remote control for determining for each broadcast displayed by said television set the channel on which that broadcast is being received; and means connected to said determining means and coupled to said second manually actuable means for polling said determining means as to the channel on which a broadcast displayed by said television set is received and said second manually actuable means as to received viewer reactions to a displayed broadcast received over the latter channel.

2. In a system for determining viewing habits of television viewers in a multi-channel television broadcast reception area including a television broadcast display set located in a room, the improvement comprising in combination:

a remote control for said television set including first manually actuable means located at a distance from said television set across the room for transposing each television broadcast received on any one of a predetermined number of channels to one predetermined channel, and means for providing viewers with a facility to register viewer reactions in the context of channel selection, including second manually actuable means adjacent said first manually actuable means for receiving television viewer reactions;

means connected to said across-the-room remote control and said television set for transmitting any television broadcast over said one predetermined channel for display by said television set;

means coupled to said across-the-room remote control for determining for each broadcast displayed by said television set the channel on which that broadcast is being received; and means connected to said determining means and coupled to said second manually actuable means for polling said determining means as to the channel on which a broadcast displayed by said television set is received and said second manually actuable means as to received viewer reactions to a displayed broadcast received over the latter channel.

3. In a system for determining viewing habits of television viewers in a multi-channel television broadcast reception area including a television broadcast display set located in a room, the improvement comprising in combination:
- a remote control for said television set including a manually actuable channel tuner located at a distance from said television set across the room for selectively receiving television broadcasts on any one of a predetermined number of channels and means for providing viewers with a facility to register viewer reactions in the context of channel selection, including manually actuable means adjacent said channel tuner for receiving television viewer reactions;
- means connected to said across-the-room remote control and said television set for transmitting any selectively received broadcast from said tuner over said distance for display by said television set;
- means coupled to said across-the-room remote control for determining for each broadcast displayed by said television set the channel on which that broadcast is being received; and
- means connected to said determining means and coupled to said means for receiving television viewer reactions for polling said determining means as to the channel on which a broadcast displayed by said television set is received and said means for receiving television viewer reactions as to received viewer reactions to a displayed broadcast received over the latter channel.

4. A method of providing television audience survey systems with improved acceptability by the television audience and accuracy of the survey, and of encouraging increased and more meaningful viewer participation in a multi-channel television broadcast reception area including television sets for displaying television broadcasts to viewers participating in the survey, comprising in combination:
- providing viewers with a facility to register viewer reactions in the context of channel selection at a distance from each television set from the convenience of each participating viewer's preferred viewing position, by situating at each preferred viewing position a remote control for said television set including first manually actuable means for causing said television set to display a television broadcast received on any one of a predetermined number of channels and by situating at each preferred viewing position second manually actuable means adjacent the first manually actuable means for receiving at each preferred viewing position television viewer reactions to displayed television broadcasts;
- determining for each broadcast displayed by said television set the channel on which that broadcast is being received; and
- determining from said second manually actuable means received viewer reactions to a displayed broadcast received over the latter channel.

5. A method of providing television audience survey systems with improved acceptability by the television audience and accuracy of the survey, and of encouraging increased and more meaningful viewer participation in a multi-channel television broadcast reception area including television sets for displaying television broadcasts to viewers participating in the survey, comprising in combination:
- providing viewers with a facility to register viewer reactions in the context of channel selection at a distance from each television set from the convenience of each participating viewer's preferred viewing position, by situating at each preferred viewing position a remote control for said television set including first manually actuable means for transposing each television broadcast received on any one of a predetermined number of channels to one predetermined channel for display by said television set, and by situating at each preferred viewing position second manually actuable means adjacent the first manually actuable means for receiving at each preferred viewing position television viewer reactions to displayed television broadcasts;
- determining for each broadcast displayed by said television set the channel on which that broadcast is being received; and
- determining from said second manually actuable means received viewer reactions to a displayed broadcast received over the latter channel.

6. A method of providing television audience survey systems with improved acceptability by the television audience and accuracy of the survey, and of encouraging increased and more meaningful viewer participation in a multi-channel television broadcast reception area including television sets for displaying television broadcasts to viewers participating in the survey, comprising in combination:
- providing viewers with a facility to register viewer reactions in the context of channel selection at a distance from each television set from the convenience of each participating viewer's preferred viewing position, by situating at each preferred viewing position a remote control for said television set including a manually actuable channel tuner for selectively receiving television broadcasts on any one of a predetermined number of channels for display by said television set, and by situating at each preferred viewing position manually actuable means adjacent the manually actuable channel tuner for receiving at each preferred viewing position television viewer reactions to displayed television broadcasts;
- determining for each broadcast displayed by said television set the channel on which that broadcast is being received; and
- determining from said second manually actuable means received viewer reactions to a displayed broadcast received over the latter channel.

7. In a system for determining viewing habits of television viewers in a multi-channel television broadcast reception area including a television broadcast display set located in a room, the improvement comprising:
- means including a remote control for said television set including first manually actuable means located at a distance from said television set across the room for causing said television set to display a television broadcast received on any one of a predetermined number of channels and means for providing viewers with a facility to register viewer reactions to said displayed broadcast, including second manually actuable means adjacent said first manually actuable means for receiving television viewer reactions to displayed television broadcasts, said second manually actuable means including distinct first, second, third, and fourth manually engageable devices for receiving from a viewer very favorable, moderately favorable, moderately unfavorable and very unfavorable viewer reactions, respectively, to a displayed broadcast.

8. In a system for determining viewing habits of television viewers in a multi-channel television broadcast reception area including a television broadcast display set located in a room, the improvement comprising in combination:

a remote control for said television set including first manually actuable means located at a distance from said television set across the room for transposing each television broadcast received on any one of a predetermined number of channels to one predetermined channel, and means for providing viewers with a facility to register viewer reactions to a displayed broadcast, including second manually actuable means for receiving television viewer reactions, said second manually actuable means including distinct first, second, third and fourth manually engageable devices for receiving from a viewer very favorable, moderately favorable, moderately unfavorable and very unfavorable viewer reactions, respectively, to a displayed broadcast;

means connected to said across-the-room remote control and said television set for transmitting any television broadcast over said one predetermined channel for display by said television set; and means coupled to said across-the-room remote control for determining for each broadcast displayed by said television set the channel on which that broadcast is being received.

9. In a system for determining viewing habits of television viewers in a multi-channel television broadcast reception area including a television broadcast display set located in a room, the improvement comprising in combination:

a remote control for said television set including a manually actuable channel tuner located at a distance from said television set across the room for selectively receiving television broadcasts on any one of a predetermined number of channels and means for providing viewers with a facility to register viewer reactions to a displayed broadcast, including manually actuable means adjacent said channel tuner for receiving television viewer reactions, said manually actuable means including distinct first, second, third, and fourth manually engageable devices for receiving from a viewer very favorable, moderately favorable, moderately unfavorable and very unfavorable viewer reactions, respectively, to a displayed broadcast.

means connected to said across-the-room remote control and said television set for transmitting any selectively received broadcast from said tuner over said distance for display by said television set; and means coupled to said across-the-room remote control for determining for each broadcast displayed by said television set the channel on which that broadcast is being received.

10. A method of providing television audience survey systems with improved acceptability by the television audience and accuracy of the survey, and of encouraging increased and more meaningful viewer participation in a multi-channel television broadcast reception area including television sets for displaying television broadcasts to viewer participating in the survey, comprising in combination:

providing viewers with a facility to register viewer reactions in the context of channel selection at a distance from each television set from the convenience of each participating viewer's preferred viewing position, by situating at each preferred viewing position a remote control for said television set including first manually actuable means for causing said television set to display a television broadcast received on any one of a predetermined number of channels and by situating at each preferred viewing position second manually actuable means adjacent the first manually actuable means for receiving at each preferred viewing position television viewer reactions to displayed television broadcasts, said second manually actuable means being equipped with distinct first, second, third, and fourth manually engageable devices for receiving from a viewer very favorable, moderately favorable, moderately unfavorable and very unfavorable viewer reactions, respectively, to a displayed broadcast;

determining for each broadcast displayed by said television set the channel on which that broadcast is being received; and determining from said second manually actuable means received viewer reactions to a displayed broadcast received over the latter channel.

11. A method of providing television audience survey systems with improved acceptability by the television audience and accuracy of the survey, and of encouraging increased and more meaningful viewer participation in a multi-channel television broadcast reception area including television sets for displaying television broadcasts to viewers participating in the survey, comprising in combination:

providing viewers with a facility to register viewer reactions in the context of channel selection at a distance from each television set from the convenience of each participating viewer's preferred viewing position, by situating at each preferred viewing position a remote control for said television set including first manually actuable means for transposing each television broadcast received on any one of a predetermined number of channels to one predetermined channel for display by said television set, and by situating at each preferred viewing position second manually actuable means adjacent the first manually actuable means for receiving at each preferred viewing position television viewer reactions to displayed television broadcast, said second manually actuable means being equipped with distinct first, second, third and fourth manually engageable devices for receiving from a viewer very favorable, moderately favorable, moderately unfavorable and very unfavorable viewer reactions, respectively, to a displayed broadcast;

determining for each broadcast displayed by said television set the channel on which that broadcast is being received; and determining from said second manually actuable means received viewer reactions to a displayed broadcast received over the latter channel.

12. A method of providing television audience survey systems with improved acceptability by the television audience and accuracy of the survey, and of encouraging increased and more meaningful viewer participation in a multi-channel television broadcast reception area including television sets for displaying television broadcasts to viewers participating in the survey, comprising in combination:

providing viewers with a facility to register viewer reactions in the context of channel selection at a distance from each television set from the convenience of each participating viewer's preferred viewing position, by situating at each preferred viewing position a remote control for said television set including a manually actuable channel tuner for selectively receiving television broadcasts on any one of a predetermined number of channels for display by said television set, and by situating at each preferred viewing position manually actuable means adjacent the manually actuable channel tuner for receiving at each preferred viewing position television viewer reactions to displayed television broadcasts, said manually actuable means being equipped with distinct first, second, third and fourth manually engageable devices for receiving from a viewer very favorable, moderately favorable, moderately unfavorable and very unfavorable viewer reactions, respectively, to a displayed broadcast;

determining for each broadcast displayed by said television set the channel on which that broadcast is being received; and determining from said second manually actuable means received viewer reactions to a displayed broadcast received over the latter channel.

* * * * *